(12) United States Patent
Sakai et al.

(10) Patent No.: US 8,169,455 B2
(45) Date of Patent: May 1, 2012

(54) OPTICAL SCANNING DEVICE, IMAGE FORMING APPARATUS, CONTROL METHOD, AND COMPUTER PROGRAM PRODUCT

(75) Inventors: Kohji Sakai, Tokyo (JP); Yoshinori Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 355 days.

(21) Appl. No.: 12/685,768

(22) Filed: Jan. 12, 2010

(65) Prior Publication Data

US 2010/0194843 A1    Aug. 5, 2010

(30) Foreign Application Priority Data

Feb. 2, 2009   (JP) .................. 2009-021996
Oct. 9, 2009   (JP) .................. 2009-235191

(51) Int. Cl.
*H01S 5/068* (2006.01)
*H01S 5/0683* (2006.01)
*B41J 2/447* (2006.01)
*B41J 2/455* (2006.01)
*B41J 2/47* (2006.01)

(52) U.S. Cl. .................... 347/236; 359/204.2
(58) Field of Classification Search .......... 347/233, 347/236, 246; 359/204.1, 204.2
See application file for complete search history.

(56) References Cited

U.S. PATENT DOCUMENTS

| | | | |
|---|---|---|---|
| 7,145,705 B2 | 12/2006 | Hayashi | |
| 7,218,432 B2 | 5/2007 | Ichii et al. | |
| 7,253,937 B2 | 8/2007 | Ueda et al. | |
| 7,271,823 B2 | 9/2007 | Izumi et al. | |
| 7,362,486 B2 | 4/2008 | Hayashi et al. | |
| 7,417,777 B2 | 8/2008 | Saisho et al. | |
| 7,443,558 B2 | 10/2008 | Sakai et al. | |
| 7,471,434 B2 | 12/2008 | Nakamura et al. | |
| 7,495,813 B2 | 2/2009 | Akiyama et al. | |
| 7,529,011 B2 | 5/2009 | Fujii | |
| 7,545,547 B2 | 6/2009 | Hayashi et al. | |
| 7,616,364 B2 | 11/2009 | Saisho et al. | |
| 7,623,280 B2 | 11/2009 | Hirakawa et al. | |
| 7,626,744 B2 | 12/2009 | Arai et al. | |
| 8,009,342 B2 * | 8/2011 | Sakai | 359/198.1 |
| 2006/0232659 A1 | 10/2006 | Hayashi et al. | |
| 2006/0284968 A1 | 12/2006 | Hayashi et al. | |
| 2007/0058255 A1 | 3/2007 | Imai et al. | |
| 2007/0211326 A1 | 9/2007 | Saisho et al. | |
| 2007/0253048 A1 | 11/2007 | Sakai et al. | |
| 2007/0297036 A1 | 12/2007 | Nakamura et al. | |
| 2008/0024849 A1 | 1/2008 | Hayashi et al. | |
| 2008/0025759 A1 | 1/2008 | Ichii et al. | |
| 2008/0062491 A1 | 3/2008 | Nakamura et al. | |
| 2008/0068689 A1 | 3/2008 | Saisho et al. | |

(Continued)

FOREIGN PATENT DOCUMENTS

JP    2006-332142 A    12/2006
(Continued)

*Primary Examiner* — Huan Tran
(74) *Attorney, Agent, or Firm* — Dickstein Shapiro LLP

(57) ABSTRACT

In an optical scanning device including a vertical cavity surface emitting laser (VCSEL), an optical scanning device controls so as to satisfy P1<P100 and Wm>Ws, where P1 is light intensity obtained when a period of time corresponding to a minimum pixel unit (referred to as "T1") has elapsed after start of illumination; P100 is light intensity obtained when a period of time 100 T1 has elapsed after the start of illumination; Wm is the static beam spot diameter in the main-scanning direction; and Ws is the static beam spot diameter in the sub-scanning direction.

8 Claims, 7 Drawing Sheets

U.S. PATENT DOCUMENTS

| | | |
|---|---|---|
| 2008/0068693 A1 | 3/2008 | Hayashi et al. |
| 2008/0123159 A1 | 5/2008 | Hayashi et al. |
| 2008/0180772 A1 | 7/2008 | Miyatake et al. |
| 2008/0192319 A1 | 8/2008 | Miyatake et al. |
| 2008/0204840 A1 | 8/2008 | Watanabe et al. |
| 2008/0204841 A1 | 8/2008 | Suzuki et al. |
| 2008/0212999 A1 | 9/2008 | Masuda et al. |
| 2008/0218827 A1 | 9/2008 | Watanabe et al. |
| 2008/0219601 A1 | 9/2008 | Arai et al. |
| 2008/0225106 A1 | 9/2008 | Omori et al. |
| 2008/0267662 A1 | 10/2008 | Arai et al. |
| 2008/0267663 A1 | 10/2008 | Ichii et al. |
| 2008/0284838 A1 | 11/2008 | Suzuki et al. |
| 2008/0285104 A1 | 11/2008 | Arai et al. |
| 2009/0052944 A1 | 2/2009 | Kubo et al. |
| 2009/0059333 A1 | 3/2009 | Sakai |
| 2009/0060583 A1 | 3/2009 | Amada et al. |
| 2009/0141316 A1 | 6/2009 | Arai et al. |
| 2009/0175657 A1 | 7/2009 | Yoshii et al. |
| 2009/0214261 A1 | 8/2009 | Hirakawa et al. |
| 2009/0251753 A1 | 10/2009 | Hirakawa et al. |
| 2009/0315967 A1 | 12/2009 | Hayashi et al. |

FOREIGN PATENT DOCUMENTS

| | | |
|---|---|---|
| JP | 2008-213246 A | 9/2008 |
| WO | WO 2009/011290 A1 | 1/2009 |

* cited by examiner

OPTICAL SCANNING DEVICE, IMAGE FORMING APPARATUS, CONTROL METHOD, AND COMPUTER PROGRAM PRODUCT

CROSS-REFERENCE TO RELATED APPLICATIONS

The present application claims priority to and incorporates by reference the entire contents of Japanese Patent Application No. 2009-021996 filed in Japan on Feb. 2, 2009 and of Japanese Patent Application No. 2009-235191 filed in Japan on Oct. 9, 2009.

BACKGROUND OF THE INVENTION

1. Field of the Invention

The present invention relates to optical scanning devices, and more particularly, relates to optical scanning devices suitable for image forming apparatuses such as digital copiers, laser printers, and the like.

2. Description of the Related Art

Image formation using an optical scanning method is widely performed in image forming apparatuses such as digital copiers, laser printers, and the like.

A known optical scanning method capable of implementing high-speed image formation is, for example, a multiple-beam scanning method. Vertical cavity surface emitting lasers (VCSELs) have been increasingly used as a laser light source suitable for a scanning method.

Another type of laser light source using a multiple-beam scanning method includes an edge emitting type semiconductor laser array. Among semiconductor lasers, there is also a technology for combining beams using a compound prism using a plurality of edge emitting semiconductor lasers (EELs). With these technologies, only a few light-emitting elements can be arranged at the same time.

In contrast, with the vertical cavity surface emitting laser (VCSEL), tens to hundreds of laser light-emitting elements can be arrayed in a same plane where laser light is emitted and moreover, they can be individually modulated. Accordingly, with this technology, tens to hundreds of scanning lines can be simultaneously drawn. This makes it possible to fully exhibit a high-speed performance during image formation, which is an advantage of multiple-beam scanning.

However, a typical problem associated with a vertical cavity surface emitting laser is that light intensity dynamically changes when elements are driven (dynamic behavior). Such a dynamic behavior includes, for example, droop characteristic, rise time characteristic, and fall time characteristic. Related technology has been disclosed in, for example, Japanese Patent Application Laid-open No. 2006-332142 and Japanese Patent Application Laid-open No. 2008-213246.

It is known that this kind of phenomena observed in commonly used semiconductor lasers is caused by a change in threshold current because the light source element itself is heated by a current applied thereto or caused by the CR-time constant of the electric circuit. Image density varies due to these phenomena, resulting in the occurrence of poor image quality, such as uneven density, uneven color tone, and the like. Accordingly, a technology called an automatic power control (APC) to reduce such a problem has been developed.

The conventionally used edge emitting semiconductor laser (EEL) and the vertical cavity surface emitting laser differs in characteristics, such as a wavelength characteristics or a driving characteristic, due to their structural differences.

In particular, the driving characteristics significantly differ. In the edge emitting semiconductor laser (EEL), because mode hopping (wavelength hopping) occurs for an extremely short period of time when it is driven, the optical path length of the resonator changes due to heat. The gain function of a laser medium also changes due to a sudden change in characteristics immediately after a current is applied. When these changes occur, it is possible to jump up to the most advantageous mode of oscillation (large gain).

FIG. 1 is a diagram illustrating an example of observing mode hopping. The horizontal axis in FIG. 1 indicates a wavelength, and the vertical axis indicates elapsed time. FIG. 1 illustrates the optical response for each wavelength in a range of about 50 nanoseconds [ns] immediately after a driving current is applied.

Immediately after the driving current is applied, a mode on a short wavelength side (648.17 nanometers [nm]) rises. Then, a mode on a long wavelength side gradually become dominant (mode hopping), and the modes eventually come to be a single mode.

In FIG. 1, the gap between neighboring modes is 0.16 nm, i.e., about 0.2 nm, which is extremely small compared with the commonly used edge emitting semiconductor laser (EEL), which has a wavelength of 650 nm; therefore, there is no problem in terms of image forming characteristics. Specifically, this indicates that the stability of total optical output in all modes is relatively high with respect to any change in the state of the elements.

However, because vertical cavity surface emitting lasers (VCSEL) emit only one wavelength, no mode hopping theoretically occurs. There is a significant difference between the wavelength of neighboring modes, e.g., a difference in wavelength by a factor of 0.5 or 2. For example, a neighboring mode with respect to a vertical cavity surface emitting laser with a wavelength of 780 nm is 390 nm or 1,560 nm; the difference is extremely large, and, therefore, vertical cavity surface emitting lasers (VCSEL) do not oscillate because the gain of the laser medium cannot be obtained.

Accordingly, because vertical cavity surface emitting lasers (VCSEL) oscillates in a single mode whatever the circumstances, vertical cavity surface emitting lasers (VCSEL) are less flexible compared with the edge emitting semiconductor lasers (EEL); therefore, a stable optical output cannot be obtained.

In addition, a sudden change in temperature in the active layer of a semiconductor laser due to a current being applied causes a change in refractive index, which changes the state of optical confinement. Accordingly, a divergence angle (FFP: far field pattern) of a laser beam instantaneously varies; the FFP is small in a range, between a current-applied time t and a current-applied time 0, and then it becomes large over time. This variation commonly appears as a change in light intensity (rise time characteristic) in an optical system having an aperture.

In a scanning optical system, the effect of light intensity on a target surface becomes large, regardless of the system being an under-field type or an over-field type.

FIGS. 2A and 2B depict graphs that represent the dynamic behavior of unstable light intensity caused by the factors described above. The horizontal axis indicates the elapsed time from when a current-applied time is set to zero, and the vertical axis indicates observed light intensity. The dynamic behavior of the light intensity of the VCSEL is observed when a small current is applied. A case in which a current applied can be small is, for example, as follows:

(1) A case in which the number of light-emitting elements in the VCSEL is large.

(2) A case in which the sensitivity of a photosensitive element is high.

In a region where a small current is applied, FIG. 2A indicates that the optical intensity is low, and FIG. 2B indicates that the optical intensity is high. The difference Δ between light intensity (P2), obtained when the optical intensity is stable, and light intensity (P1) when the current-applied time is close to zero is Δ(a) % when the optical intensity is low and Δ(b) % when the optical intensity is high, as shown in FIGS. 2A and 2B, respectively. Δ is calculated using Equation 1 below:

$$\Delta = |(P1-P2)|/P2 \tag{1}$$

When the difference between Δ(a) and Δ(b) is large, the light intensity varies in each optical scanning device, whereby a poor image is formed.

The problem of the dynamic behavior of the light intensity shown in FIGS. 2A and 2B described above has been dealt with a technology in which driving is electrically controlled. However, to deal with the typical problem of vertical cavity surface emitting laser (VCSEL), the above technology is inadequate.

SUMMARY OF THE INVENTION

It is an object of the present invention to at least partially solve the problems in the conventional technology.

According to an aspect of the present invention there is provided an optical scanning device including a vertical cavity surface emitting laser; a driving unit that controls modulation and driving of the vertical cavity surface emitting laser; a coupling optical system that couples a beam emitted from the vertical cavity surface emitting laser; an aperture that is configured to shape a beam spot diameter on a target surface; a deflecting unit that deflects a laser beam coming from the aperture; and a scanning optical system that guides the laser beam coming from the deflecting unit to the target surface. The driving unit controls so as to satisfy conditions 1 and 2 below:

$$P1 < P100 \qquad \text{condition 1}$$

$$Wm > Ws \qquad \text{condition 2}$$

where, P1 is light intensity obtained when a period of time corresponding to a minimum pixel unit (referred to as "T1") has elapsed after start of illumination, P100 is light intensity obtained when a period of time 100 T1 has elapsed after the start of illumination, Wm is a static beam spot diameter in a main-scanning direction, and Ws is a static beam spot diameter in a sub-scanning direction.

According to another aspect of the present invention there is provided an optical scanning method implemented on an optical scanning device, the optical scanning device including a vertical cavity surface emitting laser; a driving unit that controls modulation and driving of the vertical cavity surface emitting laser; a coupling optical system that couples a beam emitted from the vertical cavity surface emitting laser; an aperture that is configured to shape a beam spot diameter on a target surface; a deflecting unit that deflects a laser beam coming from the aperture; and a scanning optical system that guides the laser beam coming from the deflecting unit to the target surface. The driving unit performing control so as to satisfy conditions 1 and 2 below:

$$P1 < P100 \qquad \text{condition 1}$$

$$Wm > Ws \qquad \text{condition 2}$$

where, P1 is light intensity obtained when a period of time corresponding to a minimum pixel unit (referred to as "T1") has elapsed after start of illumination, P100 is light intensity obtained when a period of time 100 T1 has elapsed after the start of illumination, Wm is a static beam spot diameter in a main-scanning direction, and Ws is a static beam spot diameter in a sub-scanning direction.

According to still another aspect of the present invention there is provided a computer program product that includes a computer-readable recording medium and computer program codes stored on the computer-readable recording medium which when executed on a computer cause the computer to execute a control method on an optical scanning device, the optical scanning device including a vertical cavity surface emitting laser; a driving unit that controls modulation and driving of the vertical cavity surface emitting laser; a coupling optical system that couples a beam emitted from the vertical cavity surface emitting laser; an aperture that is configured to shape a beam spot diameter on a target surface; a deflecting unit that deflects a laser beam coming from the aperture; and a scanning optical system that guides the laser beam coming from the deflecting unit to the target surface. The driving unit performing control so as to satisfy conditions 1 and 2 below:

$$P1 < P100 \qquad \text{condition 1}$$

$$Wm > Ws \qquad \text{condition 2}$$

where, P1 is light intensity obtained when a period of time corresponding to a minimum pixel unit (referred to as "T1") has elapsed after start of illumination, P100 is light intensity obtained when a period of time 100 T1 has elapsed after the start of illumination, Wm is a static beam spot diameter in a main-scanning direction, and Ws is a static beam spot diameter in a sub-scanning direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
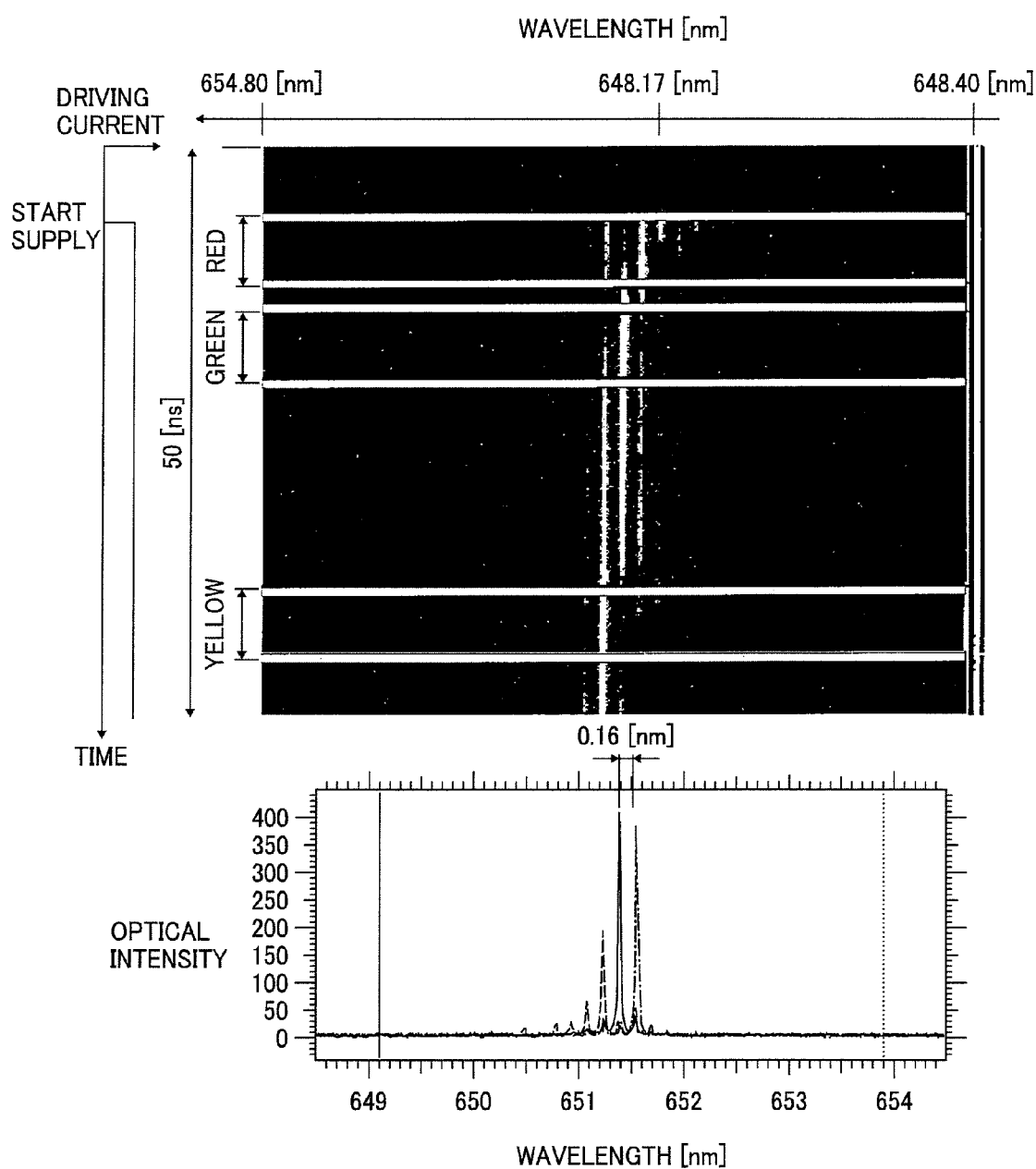
FIG. 1 is a diagram illustrating an example of observing mode hopping.

Exemplary embodiments of the present invention are described below with reference to the accompanying drawings.

An example configuration of an image forming apparatus 500 according to an embodiment of the present invention is described with reference to FIG. 3.

The image forming apparatus 500 includes a photosensitive element 511, a charging roller 512, a developing unit 513, a transfer roller 514, a cleaning device 515, a fixing unit 516, an optical scanning device 900, a paper-feeding cassette 518, a pair of registration rollers 519, a feeding roller 520, a pair of discharging rollers 522, a tray 523, and the like.

Figure 3:
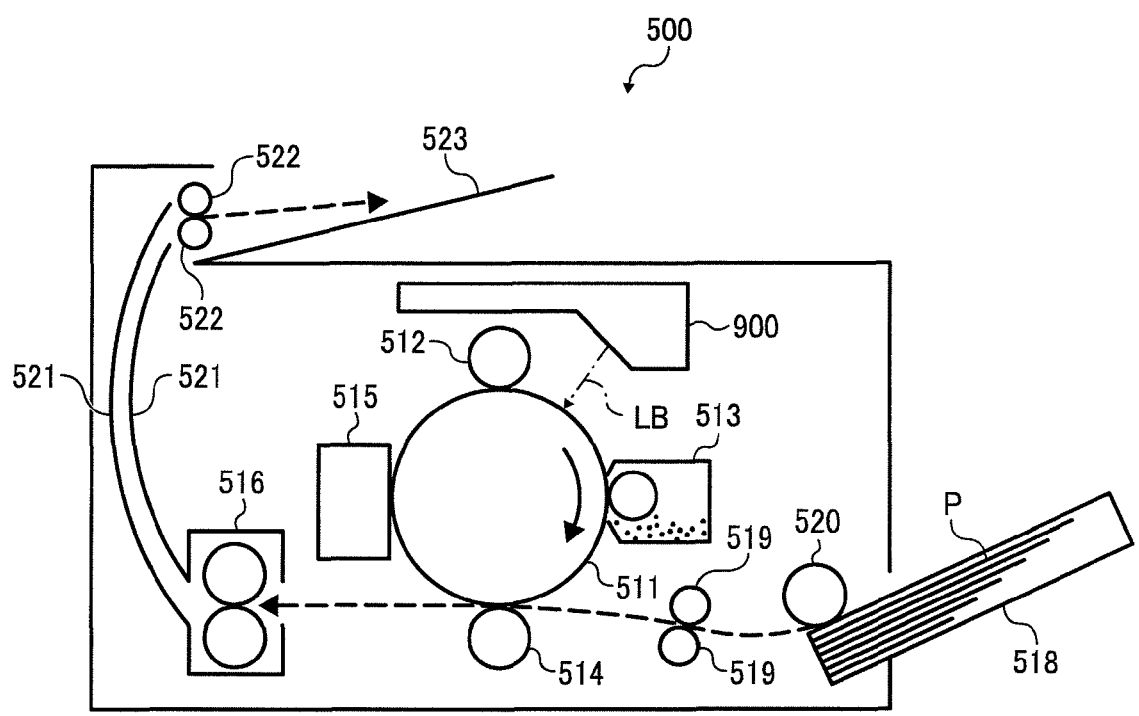
FIG. 3 is a diagram illustrating an example configuration of an image forming apparatus according to an embodiment of the present invention.

The charging roller 512, the developing unit 513, the transfer roller 514, and the cleaning device 515 are arranged in the order they are listed in this sentence and are near the surface of the photosensitive element 511 along the rotation direction of the photosensitive element 511 (the direction indicated by the arrow in FIG. 3).

The photosensitive element 511 serves as an image carrier and has a photosensitive layer with photoconductivity on the surface of the photosensitive element 511.

The charging roller 512, serving as a charging unit, uniformly charges the surface of the photosensitive element 511.

The optical scanning device 900 scans the surface of the photosensitive element 511, which is charged by the charging roller 512, with a light beam LB modulated on the basis of image information from a higher-level device (for example, a personal computer). By performing optically scanning using the optical scanning device 900, only the portion of the surface of the photosensitive element 511 that is irradiated with the light beam is discharged, and a latent image (electrostatic latent image) corresponding to the image information is formed on the surface of the photosensitive element 511. The latent image formed in this way is a negative latent image and moves toward the developing unit 513 with the rotation of the photosensitive element 511. The direction along the longitudinal direction of the photosensitive element 511 (direction parallel to the rotation axis) is referred to as the "main-scanning direction", and the rotational direction of the photosensitive element 511 is referred to as the "sub-scanning direction". A specific configuration of the optical scanning device 900 is described later.

The developing unit 513 includes a toner cartridge containing toner and causes the toner to adhere only to the portion irradiated with the light beam on the photosensitive element 511. In other words, the developing unit 513 causes the toner to adhere to the latent image formed on the surface of the photosensitive element 511, whereby the image information is made to be visible. The latent image (toner image) on which the toner is adhered moves toward the transfer roller 514 with the rotation of the photosensitive element 511.

The paper-feeding cassette 518 is attached to the main body of the image forming apparatus 500 in a detachable manner and stores sheets of transfer paper P serving as media to be transferred. The feeding roller 520 is arranged near the paper-feeding cassette 518 and picks up the top sheet of the transfer paper P stored in the paper-feeding cassette 518.

The pair of registration rollers 519 is arranged near the transfer roller 514 and catches the leading edge of the transfer paper fed by the feeding roller 520. The pair of registration rollers 519 conveys the transfer paper toward a nip between the transfer roller 514 and the photosensitive element 511 at a timing so that the toner image on the photosensitive element 511 moves toward a transfer position. The conveyed transfer paper is superimposed onto the toner image by the transfer roller 514, whereby the toner image is electrostatically transferred.

The transfer paper on which the toner image is transferred is conveyed to the fixing unit 516. The toner image is fixed in the fixing unit 516, passes through a conveying path 521, and is then discharged on the tray 523 by the pair of discharging rollers 522.

The cleaning device 515 cleans the surface of the photosensitive element 511 after transferring the toner image and removes remaining toner, paper dust, and the like.

Figure 4:
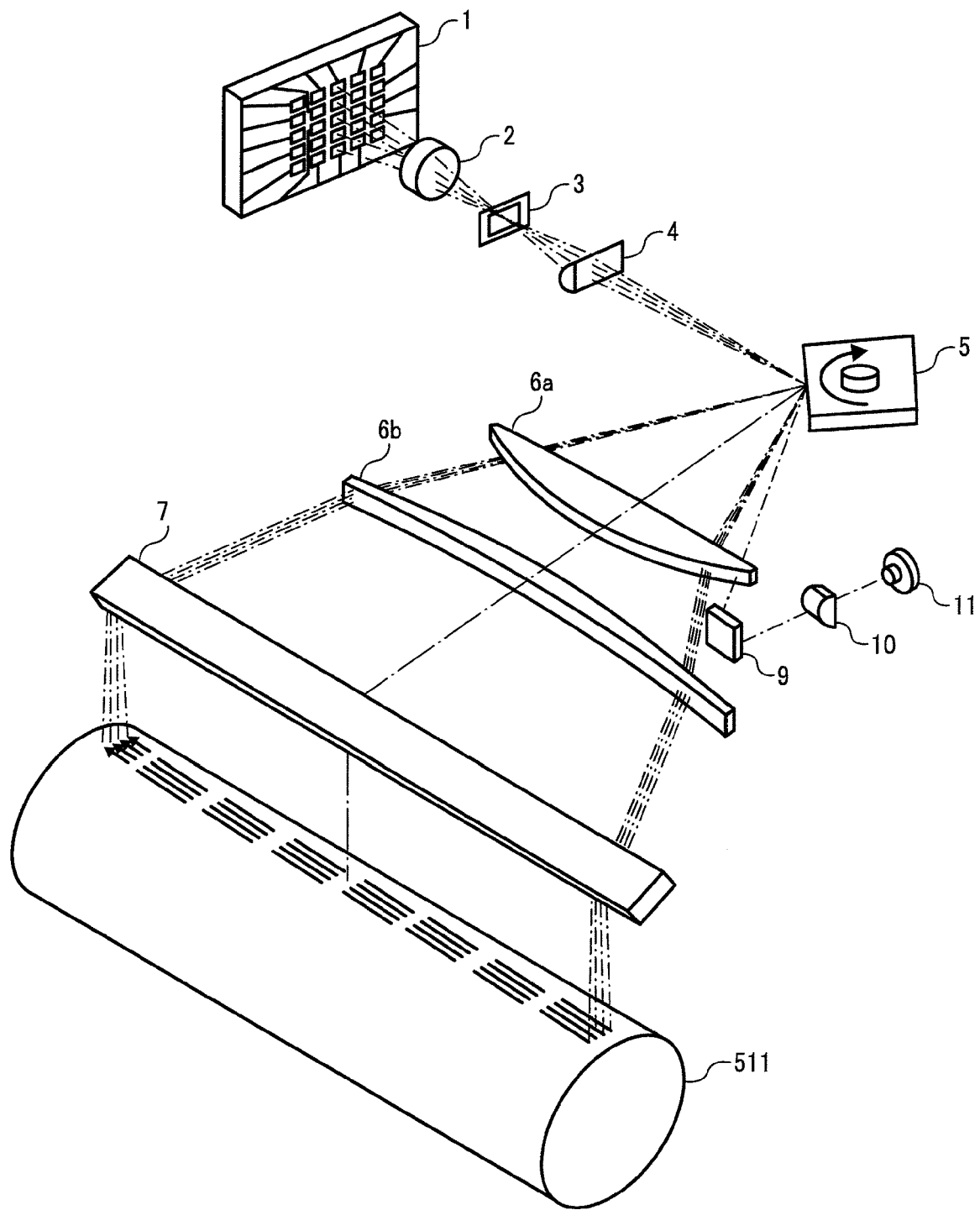
FIG. 4 is a diagram illustrating an example configuration of an optical scanning device shown in FIG. 3.

Next, an example configuration of the optical scanning device 900 is described with reference to FIG. 4.

The optical scanning device 900 includes a vertical cavity surface emitting laser 1, a coupling optical system 2, an aperture 3, a linear image forming lens 4, a polygon mirror 5 serving as a deflecting unit, two scanning lenses 6a, 6b, a deflection mirror 7, a synchronous mirror 9, a synchronous lens 10, a synchronous detecting unit 11, and the like.

The vertical cavity surface emitting laser 1 is designed to have a plurality of light-emitting portions with an emission wavelength of 780 nm in design.

The coupling optical system 2 substantially collimates the beam emitted from the vertical cavity surface emitting laser 1.

The aperture 3 has a rectangular opening, it shapes the beam passing through the coupling optical system 2, and determines the beam spot diameter on the photosensitive element 511.

The linear image forming lens 4 focuses the beam passing through the opening of the aperture 3 onto a deflecting reflection surface of the polygon mirror 5 in the sub-scanning direction.

The polygon mirror 5 deflects the beam passing through the linear image forming lens 4 while rotating at a constant speed about an axis parallel to the sub-scanning direction. The polygon mirror 5 is enclosed in a soundproof compartment (not shown) made of transparent material such as glass.

The two scanning lenses 6a and 6b guide the beam deflected by the polygon mirror 5 to the deflection mirror 7.

The deflection mirror 7 deflects an optical path of the beam passing through the scanning lens 6b toward the surface of the photosensitive element 511.

The optical components located in the optical path between the polygon mirror 5 and the photosensitive element 511 is referred to as a scanning optical system. As shown in FIG. 4 the scanning optical system includes the scanning lens 6a, the scanning lens 6b, and the deflection mirror 7. Dustproof glass (not shown) is arranged between the deflection mirror 7 and the photosensitive element 511.

Part of the beam that passes through the scanning lens 6a and that is located outside the effective scanning area is received at the synchronous detecting unit (synchronous sensor) 11 via the synchronous mirror 9 and the synchronous lens 10. The synchronous detecting unit 11 outputs a signal (photoelectric conversion signal) indicative of reception of light intensity. The timing of the scanning start is determined on the basis of the output of the synchronous detecting unit 11.

Figure 5:
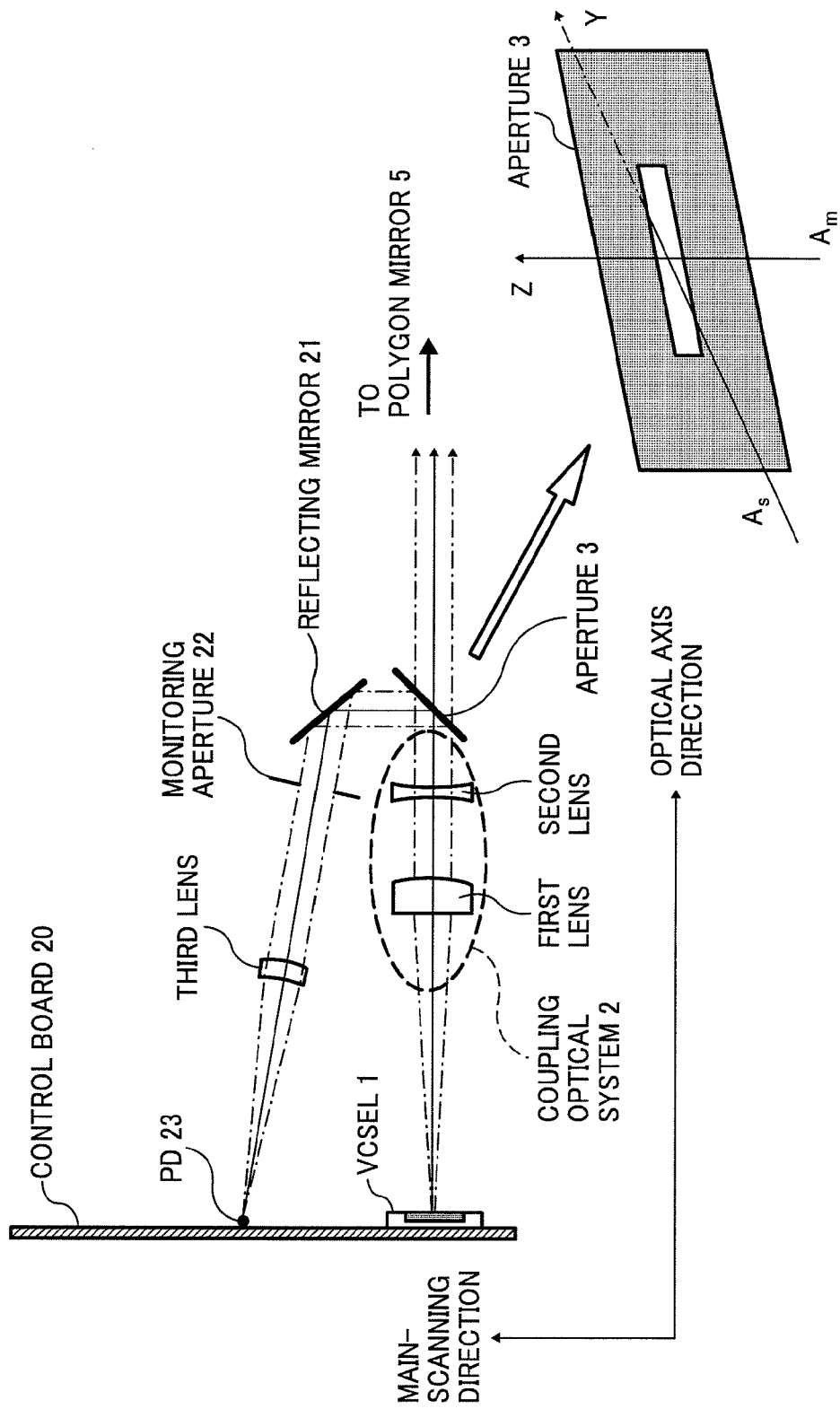
FIG. 5 is a diagram illustrating an example configuration between a vertical cavity surface emitting laser and a polygon mirror 5 shown in FIG. 3.

Next, a specific configuration between the vertical cavity surface emitting laser 1 and the polygon mirror 5 is described with reference to FIG. 5.

The vertical cavity surface emitting laser 1 is arranged on a control board 20. The control board 20 controls modulation and driving of the vertical cavity surface emitting laser 1. The vertical cavity surface emitting laser 1 emits, for example, 40 laser beams. The largest gap between scanning lines on a target surface in the sub-scanning direction is about as much as 0.4 millimeter [mm].

Figure 6:
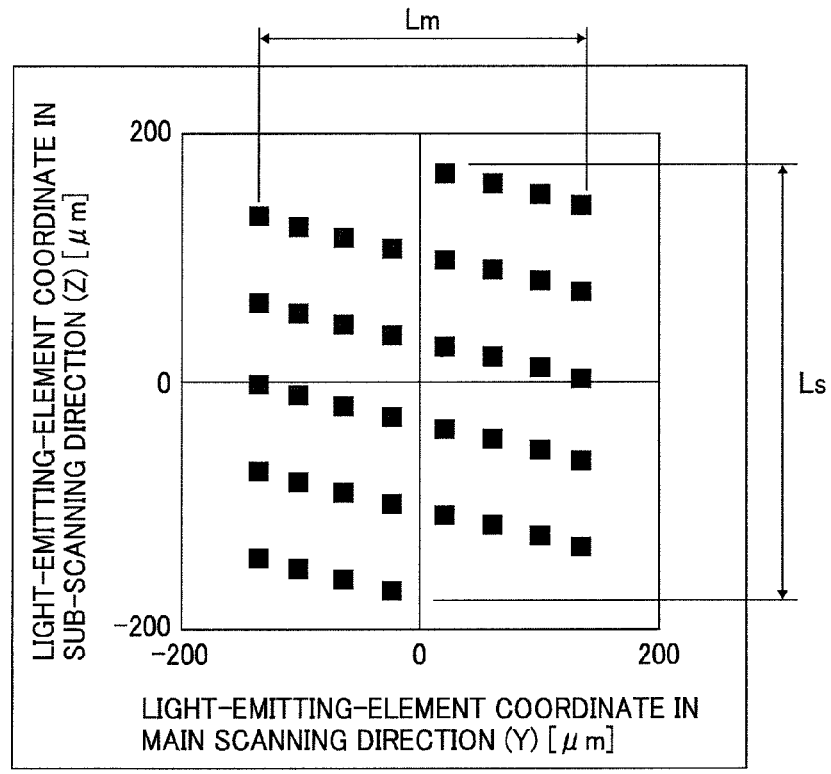
FIG. 6 is a diagram illustrating an example configuration of a vertical cavity surface emitting laser shown in FIG. 4.

As shown in FIG. 6, the vertical cavity surface emitting laser 1 is formed from a monolithic LD array in which a plurality of light-emitting elements is arrayed. In FIG. 6, Lm represents the maximum distance between the light-emitting elements aligned in the main-scanning direction, and Ls represents the maximum distance between the light-emitting elements aligned in the sub-scanning direction. The divergence angle (FFP: far field pattern) of the laser beams in a normal state (stable state when they are illuminated) is 7 degrees both in the main-scanning direction and the sub-scanning direction in an arc shape.

Returning to FIG. 5, the coupling optical system 2 includes a first lens that is a glass lens and a second lens that is a resin lens and converts the beam emitted from the vertical cavity surface emitting laser 1 to a substantially collimated beam. When temperature changes, the coupling optical system 2 functions to reduce the positional change in the beam waist and the variation in the beam spot diameter.

The aperture 3 shapes the collimated beam to make the beam spot diameter stable. In the optical system, $A_m$ is set to 5.6 mm, and $A_s$ is set to 1.18 mm. For a static beam spot diameter, $W_m$ is set to 60 micrometers [μm], and $W_s$ is set to 55 μm. $A_m$ represents the length of the aperture 3 in the main-scanning direction, and $A_s$ represents the length of the aperture 3 in the sub-scanning direction. $W_m$ represents the static beam spot diameter in the main-scanning direction, and $W_s$ represents the static beam spot diameter in the sub-scanning direction. The static beam spot diameter mentioned here means the spot diameter of the beam spot on the target surface in a state in which scanning is not performed (polygon mirror 5 is in a stationary state).

In contrast to the static beam spot diameter, a dynamic beam spot diameter is defined as a spot size of $1/e^2$ of the maximum intensity when the scanning is performed for the scanning time T1. Because of this, a dynamic beam spot diameter can be considered to be of the same size as that of an isolated one dot. T1 is defined as the time required for obtaining a value of 25.4/1200=21.2 μm, for example, when using 1200 dpi resolution.

The dynamic beam spot diameter is assumed to be $D_m=D_s=55$ μm. $D_m$ represents the dynamic beam spot diameter in the main-scanning direction, and $D_s$ represents the dynamic beam spot diameter in the sub-scanning direction. $D_m$ represents the beam spot diameter in the main-scanning direction when illumination is performed for the period of time corresponding to a minimum pixel unit (referred to as "T1") has elapsed after the start of illumination, and $D_s$ represents the beam spot diameter in the sub-scanning direction when illumination is performed for T1.

In the optical scanning device 900, the optical element arranged between the vertical cavity surface emitting laser 1 and the aperture 3 is formed on a light source unit as a single unit. With this configuration, to reduce the effects of errors in manufacturing and assembling of each of the optical elements, by adjusting both lenses, i.e., the glass lens (first lens) and the resin lens (second lens), it is possible to collectively adjust the light source as a single unit. The combined focal length of the glass lens (first lens) and the resin lens (second lens) is 45 mm.

The beam reflected by the aperture 3 is guided to a reflecting mirror 21, passes through a monitoring aperture 22 and a third lens, and is then focused onto a photo diode (PD) 23 arranged on the control board 20. Even when the light intensity of the light moving toward the polygon mirror 5 varies due to, for example, deterioration of the vertical cavity surface emitting laser 1, the control board 20 can satisfactorily correct the variation by monitoring the intensity of the light collected on the PD 23.

Figure 7:
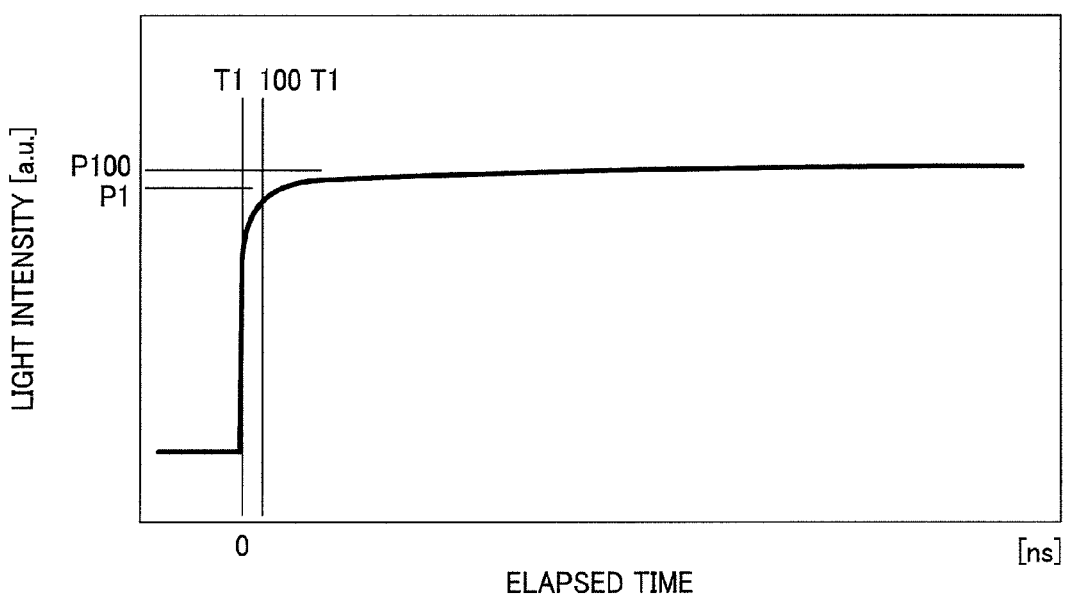
FIG. 7 is a diagram for explaining a case in which the vertical cavity surface emitting laser is set to P1<P100.

As shown in FIG. 7, when the vertical cavity surface emitting laser 1 emits light in an area where an output power is small with low injection current, the power needs to be set to P1<P100. In FIG. 7, the horizontal axis indicates elapsed time where the current-applied time is set to zero, and the vertical axis indicates observed light intensity. P1 represents light intensity obtained when a period of time corresponding to a minimum pixel unit (referred to as "T1") has elapsed after the start of illumination, and P100 represents light intensity obtained when a period of time 100 T1 has elapsed after the start of illumination.

When an image is formed, it is preferable to set the light intensity to P1=P100; however, to set the light intensity in this way, the vertical cavity surface emitting laser 1 needs to be driven by increasing the output power with high injection current. This considerably shortens the life of the vertical cavity surface emitting laser 1 and also causes the problem of thermal crosstalk between the plurality of light-emitting elements or the problem of noise due to electrical crosstalk; therefore, it is very difficult to address these problems.

When the vertical cavity surface emitting laser 1 is driven in a state of P1<P100, e.g., when a linear image with a grid pattern is depicted on a target surface, if the static beam spot diameter on the target surface is set to $W_m=W_s$ the thickness of the vertical line corresponding to the sub-scanning direction is smaller than that of the horizontal line corresponding to the main-scanning direction. To solve this problem in the simplest manner, the thickness balance between the horizontal line and the vertical line is ensured by setting $W_m>W_s$; therefore, $W_m$ is set to 60 μm and $W_s$ is set to 55 μm as described above.

Figure 8A:
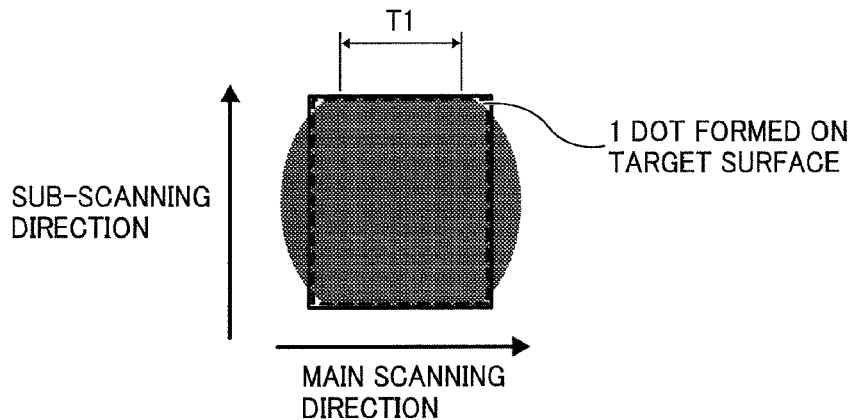
FIGS. 8A and 8B are diagrams illustrating a minimum pixel unit (1 dot) formed on a target surface.

When P1 is P100 (when the rise time of the light intensity of the VCSEL is short), the minimum pixel unit (1 dot) is assumed to be formed like that shown in FIG. 8A.

Figure 2A:
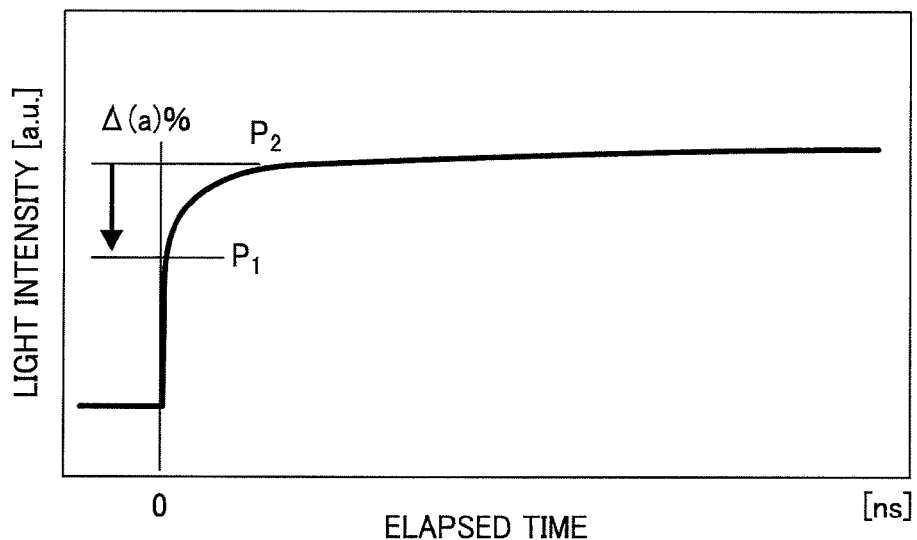
FIGS. 2A and 2B are diagrams illustrating an example of dynamic behavior of unstable light intensity.
Figure 2B:
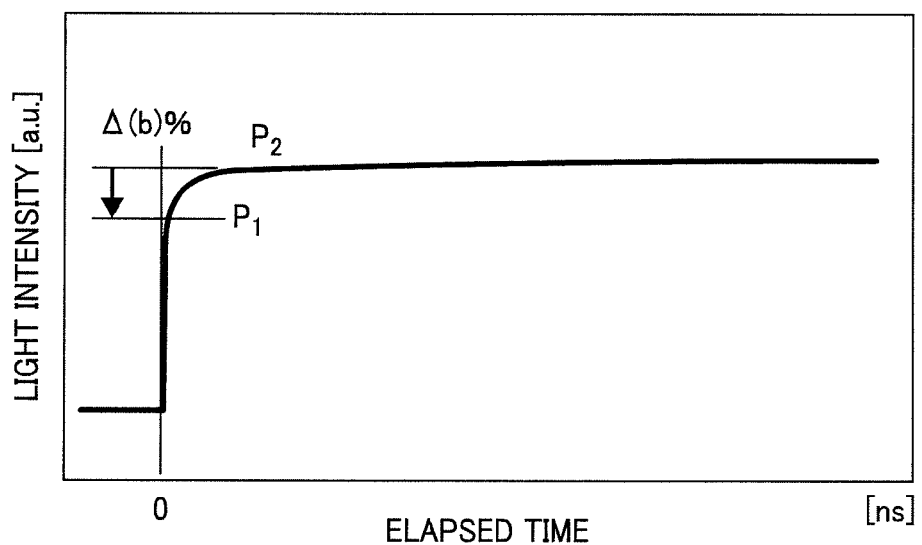
Figure 8B:
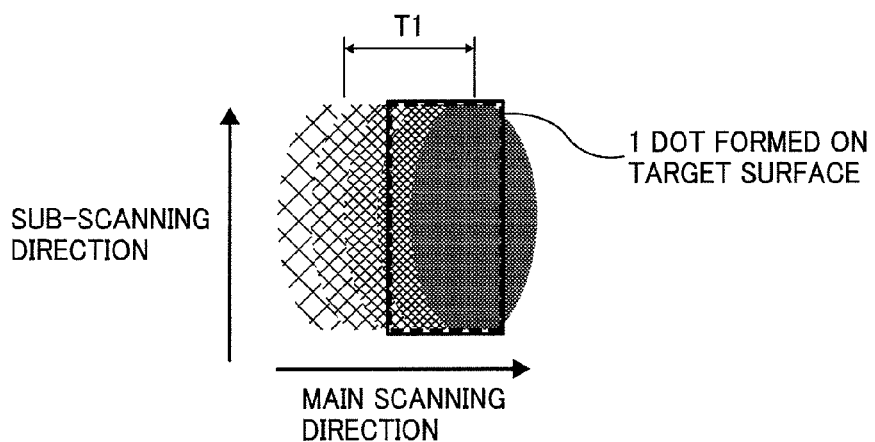

As shown in FIG. 2, when P1 is smaller than P100, i.e., the rise time of the light intensity of the VCSEL is long, even if T1 is fixed, it takes a longer time to reach light intensity for exposure and, in fact, as shown in FIG. 8B, the length of the minimum pixel unit (1 dot) in the main-scanning direction becomes small. When the horizontal line and the vertical line are depicted in a state like that shown in FIG. 8B, the thickness of the vertical line becomes smaller than that of the horizontal line.

Thus, in the embodiment, to solve the above-described problem, the static beam spot diameter is set to $W_m>W_s$ ($W_m$ represents the static beam spot diameter in the main-scanning direction, and $W_s$ represents the static beam spot diameter in the sub-scanning direction), thus ensuring the thickness balance between the horizontal line and the vertical line.

Figure 9:
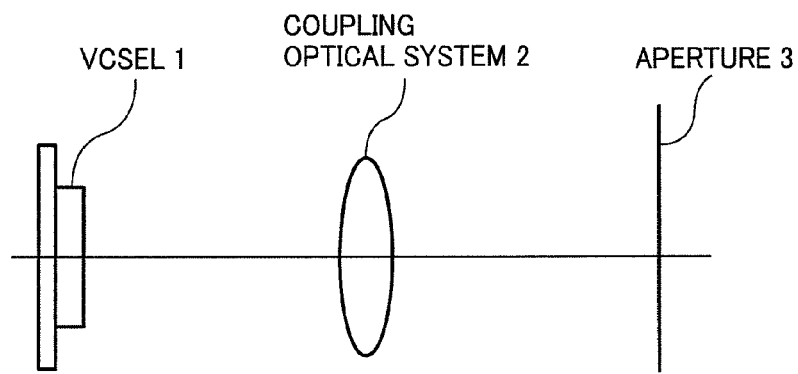
FIG. 9 is a diagram illustrating positional relations among the vertical cavity surface emitting laser, a coupling optical system, and an aperture.

FIG. 9 is a diagram illustrating positional relations among the vertical cavity surface emitting laser 1, the coupling optical system 2, and the aperture 3. The aperture 3 is arranged near the post-focal position of the coupling optical system 2. With this configuration, it is possible to make the vignetting uniform due to the aperture 3 affecting the 40 laser beams; therefore, the effect of P1<P100 can be reduced.

There may be a case in which the aperture 3 cannot be arranged near the post-focal position of the coupling optical system 2 due to the layout. In such a case, the aperture 3 is arranged between the post-focal position of the coupling optical system 2 and the coupling optical system 2 to satisfy $L_m>L_s$ and $A_m>A_s$. $L_m$ represents the maximum distance between the light-emitting elements aligned in the main-scanning direction, $L_s$ represents the maximum distance between the light-emitting elements aligned in the sub-scanning direction, $A_m$ represents the length of the aperture 3 in the main-scanning direction, and $A_s$ represents the length of the aperture 3 in the sub-scanning direction. With this configuration, light energy of the 40 laser beams can be efficiently transmitted to the optical system that is arranged downstream of the aperture 3. Furthermore, it is possible to make the dynamic behavior uniform due to P1<P100 in each light-emitting element; therefore, stability of the image can be improved.

As described above, the optical scanning device 900 includes the vertical cavity surface emitting laser 1, the control board 20 that controls modulation and driving of the vertical cavity surface emitting laser 1, the coupling optical system 2 that couples the beam emitted from the vertical cavity surface emitting laser 1, the aperture 3 that shapes the beam spot diameter on the target surface, the polygon mirror 5 that deflects the laser beam coming from the aperture 3, and the scanning optical system (scanning lens 6a, scanning lens 6b, and the deflection mirror 7 that guides the laser beam coming from the polygon mirror 5 onto the target surface.

The control board 20 controls so as to satisfy the following Conditions 1 and 2.

$$P1 < P100 \qquad \text{Condition 1}$$

$$W_m > W_s \qquad \text{Condition 2}$$

where, P1 is light intensity obtained when a period of time corresponding to a minimum pixel unit (referred to as "T1") has elapsed after the start of illumination, P100 is light intensity obtained when a period of time 100 T1 has elapsed after the start of illumination, $W_m$ is the static beam spot diameter in the main-scanning direction, and $W_s$ is the static beam spot diameter in the sub-scanning direction Accordingly, a stable image can be acquired in the optical scanning device 900 using the vertical cavity surface emitting laser 1.

Next, a concrete example of the optical scanning device 900 is described below.

First, an optical system including the aperture 3 and the linear image forming lens 4 arranged upstream of the polygon mirror 5 is described.

The beam that enters the aperture 3 is collimated. The size of the aperture is set to $A_m$=5.6 mm and $A_s$=1.18 mm. $A_m$ represents the length of the aperture 3 in the main-scanning direction, and $A_s$ represents the length of the aperture 3 in the sub-scanning direction. The linear image forming lens 4 (cylindrical lens) has a focal length of 57 mm and focuses a focal point on a reflecting surface of the polygon mirror 5.

Next, an optical system including the polygon mirror 5 and the scanning lenses 6a and 6b arranged downstream of the polygon mirror 5 is described.

The polygon mirror 5 and the scanning lenses 6a and 6b are configured in a manner like that shown in Table 1.

TABLE 1

| | $R_m$ | $R_s$ | X | Y | n |
|---|---|---|---|---|---|
| Polygon mirror (rotation axis) | — | — | 68.63 | 12.43 | — |
| Scanning lenses 6a | −125.93 | −500 | 14 | 0 | Resin 1 |
| | −60.678 | −550 | 89.34 | 0 | — |

TABLE 1-continued

| | $R_m$ | $R_s$ | X | Y | n |
|---|---|---|---|---|---|
| Scanning lenses 6b | −10000 | 268.018 | 3.5 | 0 | Resin 1 |
| | −44.257 | −44.257 | 143.92 | 0 | — |
| Target surface | — | — | — | — | — |

In Table 1 described above, $R_m$ represents the "paraxial curvature in the main-scanning direction", $R_s$ represents the "paraxial curvature in the sub-scanning direction", and X and Y represent the "relative distance from each of the origins of one of the corresponding optical elements to the next optical element". The unit thereof is millimeters.

For example, for X and Y with respect to the polygon mirror 5, the origin of the light incident surface of the scanning lens 6a (position of the optical axis on a light incident side) is 68.63 mm away from the rotation axis of the polygon mirror 5 in the optical axis direction, and 12.43 mm away from the rotation shaft of the polygon mirror 5 in the main-scanning direction. The thickness of the scanning lens 6a in the optical axis is 14 mm, the gap between the surface of the scanning lens 6a and that of the scanning lens 6b is 89.34 mm, the thickness of the scanning lens 6b in the optical axis is 3.5 mm, and the distance from the scanning lens 6b to the target surface is 143.92 mm.

Each of the scanning lenses 6a and 6b of the scanning optical system 6 has an aspheric surface. The shape thereof in the main-scanning direction is the "non-arc shape=X" that is given by Equation 1 below. Each of the scanning lenses 6a and 6b has a special surface, and a curvature Cs(Y) in a sectional plane in the sub-scanning direction (imaginary sectional plane parallel to the optical axis and the sub-scanning direction) varies in the main-scanning direction according to Equation 2 below:

$$X = \frac{Y^2/R_m}{1+\sqrt{1-(1+K_a)\cdot(Y/R_m)^2}} + \qquad (2)$$

$$A_1 \cdot Y + A_2 \cdot Y^2 + A_3 \cdot Y^3 + A_4 \cdot Y^4 + A_5 \cdot Y^5 + A_6 \cdot Y^6$$

where, $R_m$ is the paraxial curvature radius in a sectional plane in the main scanning direction; Y is the distance away from the optical axis in the main-scanning direction; $K_m$ is the constant of the cone; and $A_1$, $A_2$, $A_3$, $A_4$, $A_5$, $A_6$, . . . are higher-order coefficients.

"curvature in a sectional plane in the sub-scanning direction"

$$C_s(Y) = 1/R_s(0) + B_1 \cdot Y + B_2 \cdot Y^2 + B_3 \cdot Y^3 + B_4 \cdot Y^4 + B_5 \cdot Y^5 + B_6 \cdot Y^6 + \ldots \qquad (2)$$

where, Y is the coordinate in the main-scanning direction with the position of the optical axis being defined as the origin; $R_s(0)$ is the radius of curvature in a sectional plane in the sub-scanning direction including the optical axis; and $B_1$, $B_2$, $B_3$, $B_4$, $B_5$, $B_6$, . . . are coefficients.

The coefficients of the planes used in Equations 1 and 2 are shown in Table 2 below:

TABLE 2

| | L1 | | L2 | |
|---|---|---|---|---|
| | Sur. 1 | Sur. 2 | Sur. 1 | Sur. 2 |
| $R_{m0}$ | −125.930 | −60.678 | −10000 | 520.144 |
| a00 | 0.00000E+00 | 0.00000E+00 | 0.00000E+00 | 0.00000E+00 |
| a04 | 6.91397E−07 | 7.94205E−07 | 3.29667E−07 | 1.27206E−07 |
| a06 | −1.17421E−10 | 8.10435E−11 | −7.12268E−11 | −4.62723E−11 |
| a08 | −7.59529E−14 | −4.46442E−14 | 6.28263E−15 | 4.04792E−15 |
| a10 | 4.98921E−17 | 6.78493E−18 | −2.72118E−19 | −1.65776E−19 |
| a12 | −7.99430E−21 | 4.18587E−21 | 4.69377E−24 | 2.58917E−24 |
| $R_{s0}$ | −500 | −550 | 268.018 | −44.257 |
| b01 | | 9.48903E−06 | 1.92169E−06 | |
| b02 | | −4.04246E−06 | −9.73515E−07 | 3.26958E−07 |
| b03 | | 7.83108E−09 | 2.78624E−10 | |
| b04 | | −2.32948E−09 | 7.99963E−11 | |
| b05 | | −1.27532E−11 | −8.27927E−14 | |
| b06 | | 1.22637E−12 | 1.16623E−14 | |
| b07 | | 2.55440E−15 | 8.54769E−18 | |
| b08 | | 4.46134E−16 | −1.73644E−18 | |
| b09 | | 6.68092E−19 | −3.04034E−22 | |
| b10 | | −1.67752E−19 | 6.41013E−23 | |

The above-described embodiment is suitable for practicing an embodiment of the present invention. The present invention is not limited to the embodiment described above; various modifications can be applied so long as they do not depart from the spirit of the present invention.

For example, the operation of controlling each unit constituting the optical scanning device 900 according to the above-described embodiment can be implemented by hardware or software, or combination thereof.

When processing is performed using software, it is possible to execute a program by installing a program that stores a processing sequence in a memory in a computer mounted with dedicated hardware. Alternatively, a program can also be executed by installing the program in a general purpose computer capable of executing various processes.

For example, the program can be stored, in advance, in a hard disk or a ROM (Read Only Memory) that serves as a recording medium. Alternatively, the program can be temporarily or permanently stored (saved) in a removable recording medium. Such a removable recording medium can be provided as packaged software. The removable recording media include floppy disks (a registered trademark), compact disc read only memories (CD-ROM), magneto optical disks (MO), digital versatile discs (DVD), magnetic discs, semi-conductor memories, and the like.

The program is installed in the computer using the above-described removable recording medium. Alternatively, the program is wirelessly transmitted to the computer from a download site, or is transmitted to the computer using a wire via a network.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a vertical cavity surface emitting laser;
   a driving unit that controls modulation and driving of the vertical cavity surface emitting laser;
   a coupling optical system that couples a beam emitted from the vertical cavity surface emitting laser;
   an aperture that is configured to shape a beam spot diameter on a target surface;
   a deflecting unit that deflects a laser beam coming from the aperture; and
   a scanning optical system that guides the laser beam coming from the deflecting unit to the target surface, wherein the driving unit controls so as to satisfy conditions 1 and 2 below:

$$P1 < P100 \quad \text{condition 1}$$

$$Wm > Ws \quad \text{condition 2}$$

where, P1 is light intensity obtained when a period of time corresponding to a minimum pixel unit (referred to as "T1") has elapsed after start of illumination, P100 is light intensity obtained when a period of time 100 T1 has elapsed after the start of illumination, Wm is a static beam spot diameter in a main-scanning direction, and Ws is a static beam spot diameter in a sub-scanning direction.

2. The optical scanning device according to claim 1, wherein
   the vertical cavity surface emitting laser has a plurality of light-emitting elements, and
   the aperture is arranged near a post-focal position of the coupling optical system.

3. The optical scanning device according to claim 1, wherein
   the vertical cavity surface emitting laser has a plurality of light-emitting elements, and
   the aperture is arranged between the post-focal position of the coupling optical system and the coupling optical system, and conditions 3 and 4 below are satisfied:

$$Lm > Ls \quad \text{condition 3}$$

$$Am > As \quad \text{condition 4}$$

where, Lm is the maximum distance between the light-emitting elements arranged in the main-scanning direction, Ls is the maximum distance between the light-emitting elements arranged in the sub-scanning direction, Am is a length of the aperture in the main-scanning direction, and As is a length of the aperture in the sub-scanning direction.

4. An image forming apparatus comprising an optical scanning device according to claim 1.

5. An optical scanning method implemented on an optical scanning device, the optical scanning device including a vertical cavity surface emitting laser; a driving unit that controls modulation and driving of the vertical cavity surface emitting laser; a coupling optical system that couples a beam emitted from the vertical cavity surface emitting laser; an aperture that is configured to shape a beam spot diameter on a target surface; a deflecting unit that deflects a laser beam coming from the aperture; and a scanning optical system that guides the laser beam coming from the deflecting unit to the target surface, wherein
the driving unit performing control so as to satisfy conditions 1 and 2 below:

$$P1 < P100 \quad \text{condition 1}$$

$$Wm > Ws \quad \text{condition 2}$$

where, P1 is light intensity obtained when a period of time corresponding to a minimum pixel unit (referred to as "T1") has elapsed after start of illumination,
P100 is light intensity obtained when a period of time 100 T1 has elapsed after the start of illumination,
Wm is a static beam spot diameter in a main-scanning direction, and
Ws is a static beam spot diameter in a sub-scanning direction.

6. The optical scanning method according to claim 5, wherein
the vertical cavity surface emitting laser has a plurality of light-emitting elements, and
the aperture is arranged near a post-focal position of the coupling optical system.

7. The optical scanning method according to claim 5, wherein
the vertical cavity surface emitting laser has a plurality of light-emitting elements, and
the aperture is arranged between the post-focal position of the coupling optical system and the coupling optical system, and conditions 3 and 4 below are satisfied:

$$Lm > Ls \quad \text{condition 3}$$

$$Am > As \quad \text{condition 4}$$

where, Lm is the maximum distance between the light-emitting elements arranged in the main-scanning direction,
Ls is the maximum distance between the light-emitting elements arranged in the sub-scanning direction,
Am is a length of the aperture in the main-scanning direction, and
As is a length of the aperture in the sub-scanning direction.

8. A computer program product that includes a computer-readable recording medium and computer program codes stored on the computer-readable recording medium which when executed on a computer cause the computer to execute a control method on an optical scanning device, the optical scanning device including a vertical cavity surface emitting laser; a driving unit that controls modulation and driving of the vertical cavity surface emitting laser; a coupling optical system that couples a beam emitted from the vertical cavity surface emitting laser; an aperture that is configured to shape a beam spot diameter on a target surface; a deflecting unit that deflects a laser beam coming from the aperture; and a scanning optical system that guides the laser beam coming from the deflecting unit to the target surface, wherein
the driving unit performing control so as to satisfy conditions 1 and 2 below:

$$P1 < P100 \quad \text{condition 1}$$

$$Wm > Ws \quad \text{condition 2}$$

where, P1 is light intensity obtained when a period of time corresponding to a minimum pixel unit (referred to as "T1") has elapsed after start of illumination,
P100 is light intensity obtained when a period of time 100 T1 has elapsed after the start of illumination,
Wm is a static beam spot diameter in a main-scanning direction, and
Ws is a static beam spot diameter in a sub-scanning direction.

* * * * *